F. E. STOVER.
LAWN TRIMMER.
APPLICATION FILED OCT. 9, 1911. RENEWED AUG. 16, 1912.
1,057,015.
Patented Mar. 25, 1913.
3 SHEETS—SHEET 1.
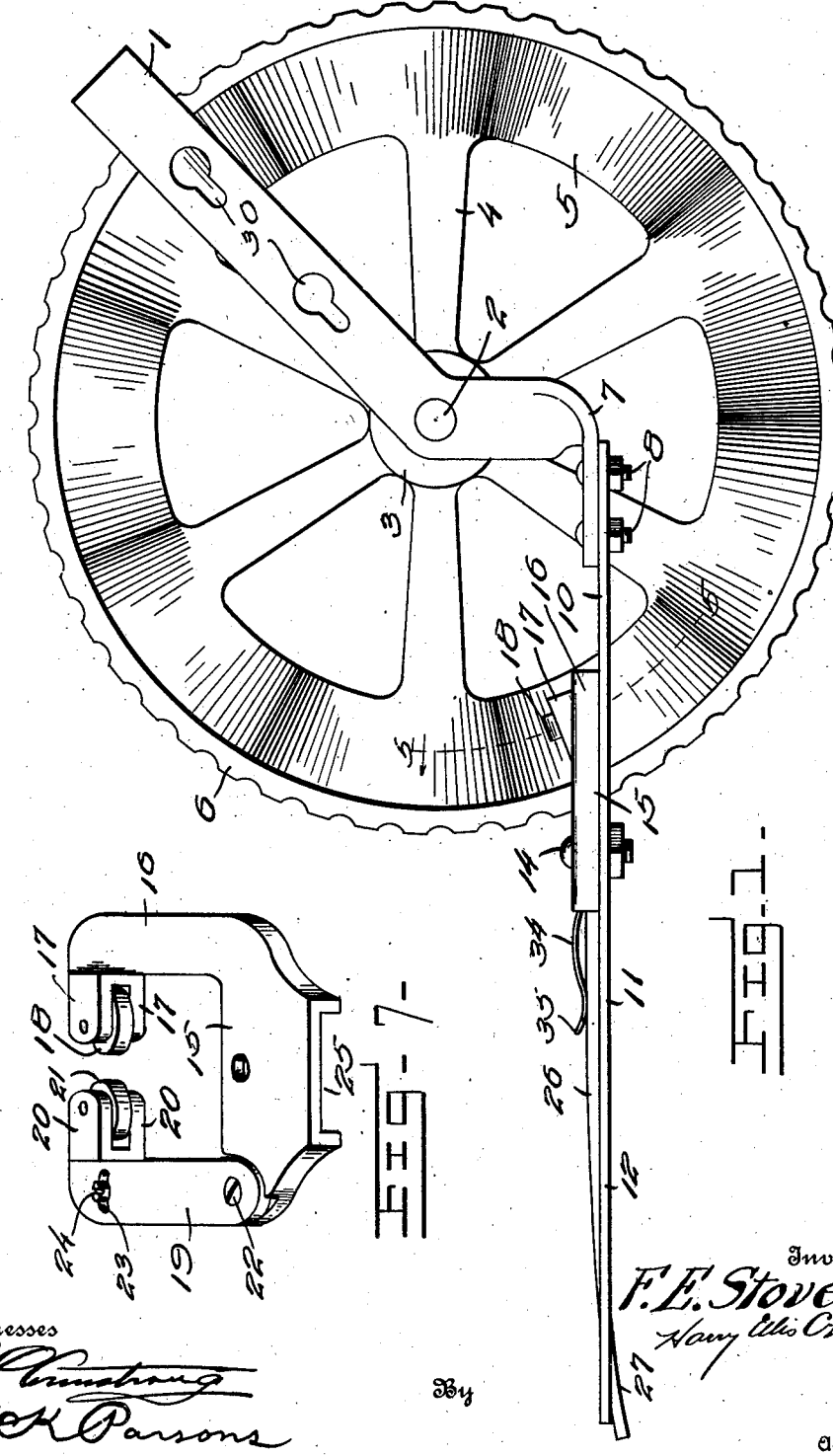
Witnesses
Inventor
F. E. Stover,
Attorney

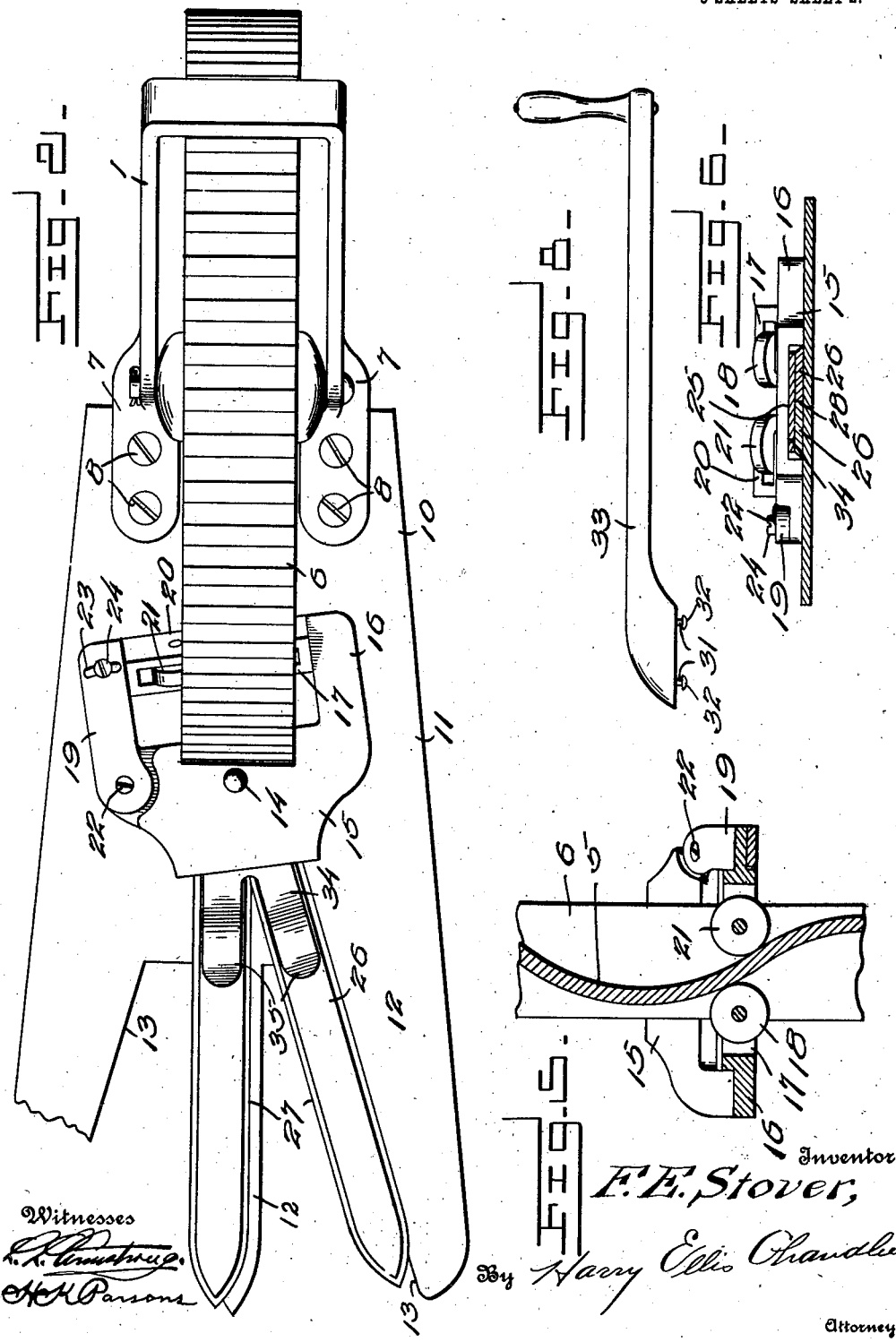

F. E. STOVER.
LAWN TRIMMER.
APPLICATION FILED OCT. 9, 1911. RENEWED AUG. 16, 1912.
1,057,015.
Patented Mar. 25, 1913.
3 SHEETS—SHEET 3.
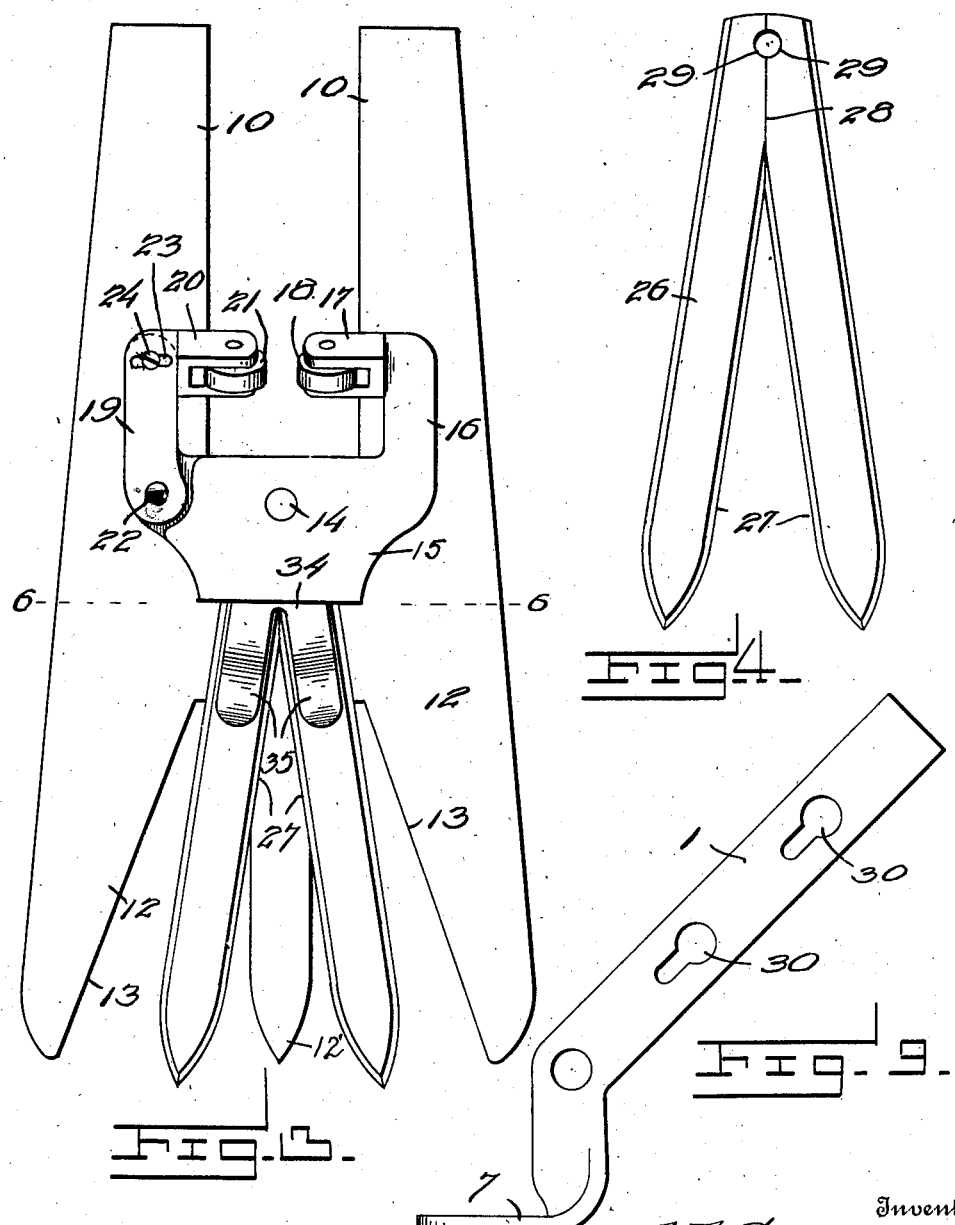

ns of Lettee

UNITED STATES PATENT OFFICE.

FRANCIS E. STOVER, OF MUSKEGON, MICHIGAN.

LAWN-TRIMMER.

1,057,015.

Specification of Letters Patent.

Patented Mar. 25, 1913.

Application filed October 9, 1911, Serial No. 653,673. Renewed August 16, 1912. Serial No. 715,524.

*To all whom it may concern:*

Be it known that I, FRANCIS E. STOVER, a citizen of the United States, residing at Muskegon, in the county of Muskegon and State of Michigan, have invented certain new and useful Improvements in Lawn-Trimmers, of which the following is a specification.

My invention relates to improvements in lawn trimmers, and has for its leading object the provision of a novel and improved device for use in trimming lawns which will serve to satisfactorily and neatly cut either high grass or merely trim a well kept lawn and which will prove particularly desirable in cutting grass which is either at the edge of a side walk or against a house where it is practically impossible to trim the same with an ordinary lawn mower.

The further object of my invention is the provision of a device of this character having the handle thereof adapted to be disposed at one side of the device and so secured that the said handle may be instantly removed and changed from one side of the trimmer to the other to facilitate use of the trimmer near a wall or building.

Another object of the invention is the provision of an improved form of cutters and of novel and improved means for securing the cutters to the machine and for shifting certain of the same to operate the trimmer.

Other objects and advantages of my improved lawn trimmer will be readily apparent by reference to the following description taken in connection with the accompanying drawings, and it will be understood that I may make any modifications in the specific structure shown and described within the scope of the appended claims without departing from or exceeding the spirit of my invention.

Figure 1 represents a side elevation of my improved trimmer. Fig. 2 represents a top plan view thereof. Fig. 3 represents an enlarged plan view of the cutters removed illustrating a different position of the movable cutters. Fig. 4 represents a detailed view of the movable cutters. Fig. 5 represents a sectional view on the line 5—5 of Fig. 1. Fig. 6 represents a sectional view on the line 6—6 of Fig. 3. Fig. 7 represents a perspective view of the roller bearing yoke for engaging the corrugated rib of the combined supporting and drive wheel. Fig. 8 represents a view of the handle of my trimmer detached, and, Fig. 9 represents a fragmentary view of the bearing yoke illustrating the slots for engaging the bolts or lugs of the handle.

In the drawings, in which similar characters of reference are employed to denote corresponding parts in the several views, the numeral 1 designates the U-shaped bearing yoke of my invention having secured to its arms the spindle 2 for the hub 3 having radiating therefrom the spokes 4 formed integral with the corrugated or undulating rib 5. A wide rim 6 is formed on the rib 5 and has a knurled or roughened tread surface to catch on the turf and prevent sliding of the wheel. The said yoke 1 has the twisted lower ends 7 to which are secured by the bolts 8 the rear ends of the furcations 10 of the stationary knife blade member 11 which has the forwardly projecting knife side fingers 12 and a central finger 12' for engaging the grass to be cut, said fingers having the sharpened or beveled cutting edges 13.

Engaged in the central portion of the blade 11 is the pivot bolt 14 on which is mounted the forward end of the Y-shaped yoke or casting 15 which has rearwardly extending arms 16 spanning the rim 6 of the wheel, one of said arms having the inwardly extending furcation 17 between which is rotatably mounted the antifriction roller 18 which bears against one side of the rib 5. The other arm of the yoke 15 is reduced in thickness and has mounted thereon the supplemental arm 19 having the furcations 20 between which is secured the roller 21. Said roller is spaced a sufficient distance from the roller 18 to just permit the rib 5 to move freely between the rollers without binding, the undulations of the rib serving to rock the yoke 15 back and forth on its pivot as the supporting wheel of the trimmer is rotated by moving of the device.

To permit of adjustment of the position of the roller 21 relative to the roller 18 and thus to vary the throw of the cutting knives, I secure the inner end of the arm 19 to the yoke by the pivot bolt 22 while I form in the arm 19 adjacent the roller bearing portion thereof the transverse slot 23 through which passes the bolt 24 engaged in the yoke. Tightening of said bolt 24 serves to clamp the arm 19 and thus its roller in adjusted position relative to the yoke and its roller. It will thus be seen that as the machine is moved over the ground the undulating portion of the supporting wheel will serve to rock the yoke, while to cut the grass over which the machine is passing I form in the under face of the stem of the shifting yoke the recess 25 into which fit the rear ends of the knife members 26 having the double beveled cutting edges 27. Said knives have the inclined edges 28 fitting against each other and each has formed therein a semi-circular recess 29, the recesses of the two blades together forming an aperture through which the pivot bolt 14 passes, said bolt thus serving to secure the knives within the recess of the yoke to oscillate therewith.

In order that the machine may be run close to a wall or other obstruction and to facilitate the propulsion thereof I form in each side of the bearing yoke 1 the key-hole slots 30 converging downwardly and adapted to allow the heads 31 of the lugs or bolts 32 to pass through their upper ends and be engaged in the lower portions of the slots. Said lugs are carried by the inner face of the handle 33 which may thus be secured to either side of the bearing yoke, the handle having a transversely disposed grip portion projecting from its upper end on the opposite side from the lugs, as is clearly shown in the drawings. The knife blades 26 have their forward portions curving slightly downward, while to resiliently force the same against the frame blade I mount in the recess 25 the spring 34 having fingers 35 bearing down upon the blades 26.

From the foregoing description taken in connection with the accompanying drawings the construction and operation of my improved lawn trimming machine will be readily apparent, and it will be seen that I have provided a simple and inexpensive machine of this character which is operated by merely pushing the same over the lawn to be cut and which will serve to smoothly cut any height of grass and will prove especially desirable for cutting grass at the edge of a walk, the side of a house or other inaccessible place for users of ordinary lawn mowers, and which machine will be highly efficient in every particular.

I claim:—

1. A lawn trimmer, including a bearing yoke, a wheel rotatably mounted within the yoke and having an undulating portion arranged at right angles to the tread of the wheel, a stationary knife member secured to the yoke and spanning the wheel, a yoke pivoted to the stationary knife member and bearing knife blades, and rollers rotatably secured to the ends of the pivoted yoke and engaging the undulating portion of the wheel, whereby rotation of the wheel shifts the yoke to oscillate the knives carried by the yoke.

2. A lawn trimmer, including a frame yoke, a knife member having furcations secured to said yoke, a wheel rotatably secured to the frame yoke and having an undulating rib arranged at right angles to the tread thereof, a yoke pivoted to the blade and having its arms adjustable relative to each other, rollers carried by the arms for engaging the undulating rib, knife blades secured to the pivoted yoke, and a spring bearing against said blades for resiliently holding the same in engagement with the frame blade member.

In testimony whereof I affix my signature, in the presence of two witnesses.

FRANCIS E. STOVER.

Witnesses:
 ANNA J. BARCUS,
 FRANK I. SWEET.